United States Patent
Miller

(10) Patent No.: US 8,849,709 B1
(45) Date of Patent: *Sep. 30, 2014

(54) ELECTRONIC COMMERCE INTEGRATION

(71) Applicant: Versata Development Group, Inc., Austin, TX (US)

(72) Inventor: Guy Miller, Austin, TX (US)

(73) Assignee: Versata Development Group, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/621,542

(22) Filed: Sep. 17, 2012

Related U.S. Application Data

(60) Continuation of application No. 12/751,562, filed on Mar. 31, 2010, now Pat. No. 8,271,356, which is a division of application No. 09/791,331, filed on Feb. 23, 2001, now Pat. No. 8,150,740.

(60) Provisional application No. 60/184,819, filed on Feb. 25, 2000.

(51) Int. Cl.
G06Q 30/00 (2012.01)
G06Q 30/06 (2012.01)

(52) U.S. Cl.
CPC ........ G06Q 30/0639 (2013.01); G06Q 30/0641 (2013.01); G06Q 30/0623 (2013.01); G06Q 30/0625 (2013.01)
USPC ...................................... 705/26.9; 705/26.62

(58) Field of Classification Search
CPC ........................ G06Q 30/0625; G06Q 30/0639
USPC ............................................. 705/26.62, 26.9
See application file for complete search history.

(56) References Cited

U.S. PATENT DOCUMENTS

| | | | |
|---|---|---|---|
| 6,032,130 A * | 2/2000 | Alloul et al. | 705/14.34 |
| 6,513,015 B2 * | 1/2003 | Ogasawara | 705/26.1 |
| 2002/0016740 A1 * | 2/2002 | Ogasawara | 705/26 |

OTHER PUBLICATIONS

"Chapters.ca and Chapters Inc. Brings 'Clicks and Mortar' Shopping to Canadians," Canada NewsWire, Ottawa, Sep. 9, 1999.*

* cited by examiner

*Primary Examiner* — Amee A Shah
(74) *Attorney, Agent, or Firm* — Haynes and Boone, LLP

(57) ABSTRACT

An information system environment is described that, among other things, facilitates integration of electronic commerce and physical store front retailer selling channels. In some realizations, the system includes a shopper accessible kiosk co-located with a physical store front retailer and an electronic commerce information service accessible from locations external to the physical store front retailer. Both access inventory information supplied from a suitable information service. The shopper accessible kiosk allows a user thereof to access inventory information particular to the physical store front retailer, while the electronic commerce information service allows a user thereof to order items from out of stock of the physical store front retailer.

7 Claims, 1 Drawing Sheet

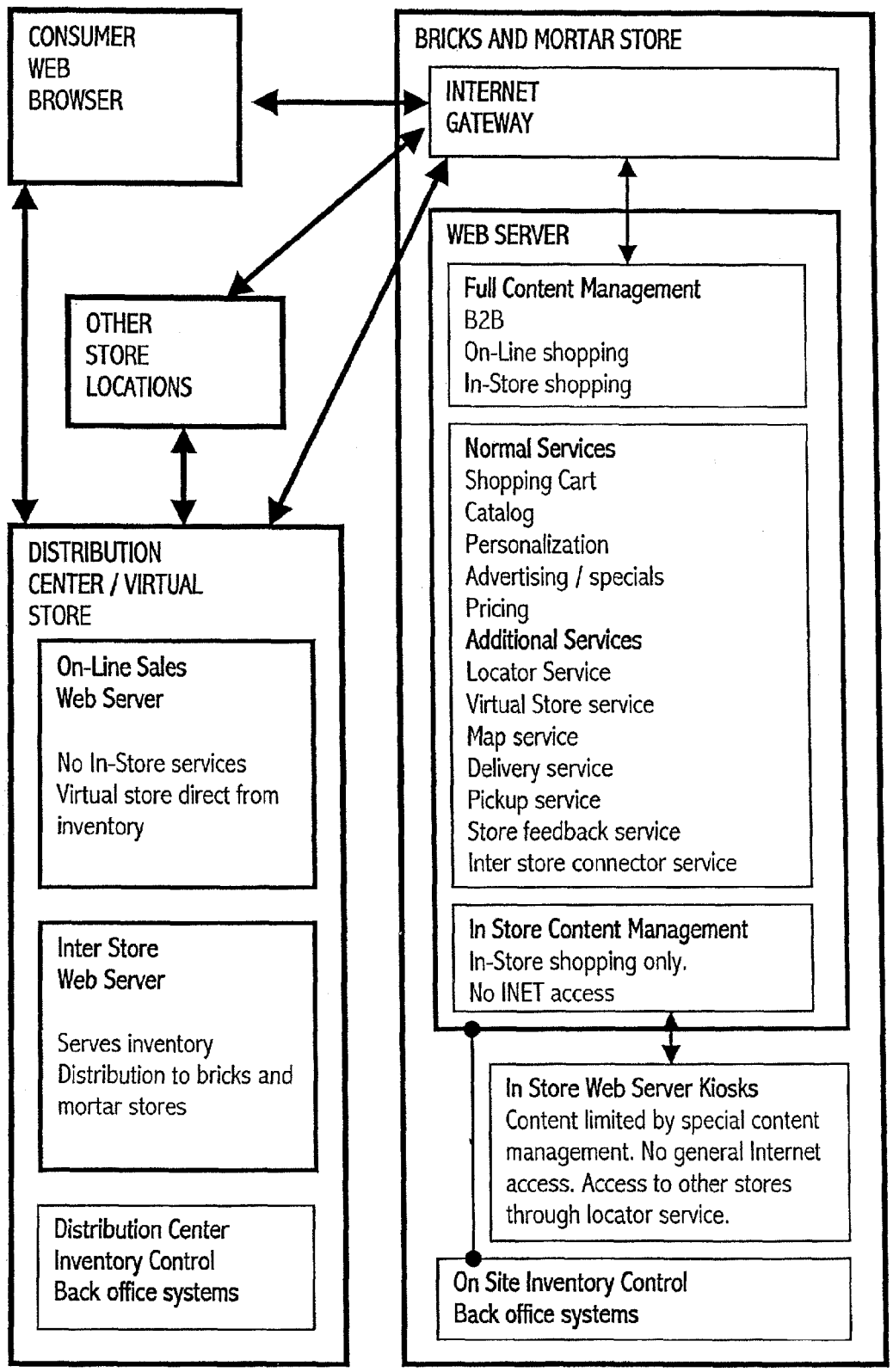

ELECTRONIC COMMERCE INTEGRATION

CROSS-REFERENCE TO RELATED APPLICATION(S)

This application is a continuation of application Ser. No. 12/751,562, filed Mar. 31, 2010, which is itself a divisional of application Ser. No. 09/791,331, filed Feb. 23, 2001, now U.S. Pat. No. 8,150,740, entitled Electronic Commerce Integration, naming Guy Miller as inventor, which application in turn claims benefit under 35 U.S.C. §119(e) of provisional application No. 60/184,819, filed Feb. 25, 2000, which applications are incorporated herein by reference.

BACKGROUND OF THE INVENTION

1. Field of the Invention

The invention relates to electronic commerce techniques.

2. Description of the Related Art

In recent years, electronic commerce has become a popular selling channel, particularly for technology oriented goods and services. At the same time, inventory systems employed by traditional physical store front businesses, often called "bricks and mortar" businesses, have become increasingly sophisticated. Unfortunately, electronic commerce sites and the physical store front have, for the most part remained separate selling channels. An opportunity exists to integrate aspects of the two selling channels and to provide improved shopping experiences for purchasers.

BRIEF DESCRIPTION OF THE DRAWINGS

The present invention may be better understood, and its numerous objects, features, and advantages made apparent to those skilled in the art by referencing the accompanying drawings.

FIG. 1 depicts an exemplary functional block diagram of an information system in accordance with some embodiments of the present invention.

DESCRIPTION OF THE PREFERRED EMBODIMENT(S)

This document describes a system that allows tighter integration between traditional retail via bricks and mortar stores, with on-line businesses operated by the same company, or simply to streamline traditional business in the absence of an on-line presence. It allows businesses to maximize sales through existing channels while at the same time help e-business get started or increase revenues. It does this by providing a system which maximizes the shopping experience for the customer, as well as providing multiple ways for the customer to interact with the retail business. It allows any business the edge over competitors who do not employ computer aided purchasing or companies that currently maintain traditional retail and electronic retail as separate businesses.

Imagine a typical scenario. You want to fix a plumbing leak from a backflow preventer on an outside faucet. There are a number of home or hardware stores in the vicinity, and several on line businesses. You could buy the product on line, but really want to do the job today. You go to the nearest and biggest home store to purchase the replacement piece. On arrival at the store, you must first locate the section for plumbing. After walking the aisles in the plumbing section several times looking in all the nooks and crannies you don't see what you are looking for, nor even an empty space where it used to be. You look for a store representative. There are none in the vicinity so you go in search of one. You eventually find one but they don't have a clue what you are talking about. Next you go to customer service. They don't know what it is either. You ask them to look it up on their computer. They don't have a way to do that. You really want to leave the store right now, but just at that minute a veteran sales person tells you they are in the seasonal department. Now imagine the same scenario using this business system. First, you check the store on line to see if it carries the item and if they are in stock. Then, you note the location of the item in the store, or maybe build a list of all the items that you want to purchase. Now you go to the store, pick up your purchases and leave. Maybe while you were in the store you thought of another piece that you needed, the washers for the hose fitting. You can use the in store kiosk or maybe your cell phone browser to locate the extra piece.

This example is just one of many ways the enhanced services described in more detail later on can benefit the consumer.

Overview

The illustration in FIG. 1 shows the main outline of the system. The main blocks show different physical locations such as the consumer's web browser, the on line store, and the traditional retail outlets. It might be that the physical location of the e business could be the same as one or more bricks and mortar stores, but that does not matter for this system. The system includes several web servers coupled with back end inventory control systems. The web servers are responsible for serving the relevant content according to the type and physical location of a particular activity. The different physical locations for the consumer to use the services include at his/her home or place of work where they have a computer, in the store itself through a kiosk, or possibly via low bandwidth services offered up over the consumer's cell phone.

Advantages of some realizations of the proposed system include:

1. Removal of boundaries between on-line business and traditional business.
2. Removal of boundaries for access to the system.
3. Removal of boundaries between supply side of the business and the sell side.
4. Tight integration between all of the components, but with flexible presentation.
5. Provide a tool that can be used equally by the consumer and the store assistants or business managers.
6. Turns a store into a virtual warehouse for an on-line customer.
7. Turn an on-line business warehouse into a source for a bricks and mortar customer.
8. Provide side by side cost and delivery comparisons between buying on-line or at a bricks and mortar store.
9. Allows the customers to participate in the maintenance of the site information.

Not all realizations will exhibit all advantages.

Platform

This system is designed to be implemented using facilities such as provided by the Multi Channel Commerce system (MCC), available from Trilogy Software, Inc., Austin, Tex., but could equally well be implemented using any web technology current or future which is capable of providing the same level of integration and scalability as MCC. MCC is a system which enables integration of web, application, and database servers in a distributed n-tier architecture. It provides the concepts of services which implement and perform specific functions as a server, and modules which talk to services as clients. MCC also manages the separation of content and presentation. For the remainder of this document we will mainly be concerned with services, used in a more generic fashion to describe core functions that the system will provide. In an actual MCC implementation most of these core functions would be implemented as MCC services. These services may, but need not necessarily contain state information. In this implementation the components are loosely coupled but the data is tightly coupled, allowing greater flexibility and easier maintenance. Facilities, such as the SAP connector, also available from Trilogy Software, Inc., may also be employed in some realizations.

Kiosks

In-store kiosks are well known in the art and any of a number of implementations are suitable. For a kiosk to succeed, it is desirable that it include a simple interface that everyone can use. As the web browser becomes a regular part of everyone's lives this presents an ideal interface with which a lot of people are familiar. The added benefit is that it is relatively easy and inexpensive to set up low power computers as a machine running nothing but a web browser. The content served up at the browser running at a kiosk has content allowable, and modified for, that location. See the detailed description that follows for more information on how this works.

Easy Maintenance

An interesting aspect of the approach used by this system is the ability of the consumer to also be able to perform maintenance in the form of raising errors and posting corrections. Another aspect is that the tool can equally well be used by store employees to perform tasks such as stocking shelves. The tool will guide the location to be stocked and could be used to print out orders to store personnel. Keeping track of stock on the shelves is also simplified by this system. Coupling to the back office systems (e.g. using Trilogy SAP connector) closes the loop. The immediate benefits to a store implementing such a system in addition to the obvious ones such as customer satisfaction, would be to reduce the amount of training required for store staff, and to streamline the actual business of running the store.

Details

In Store Web Server

In some realizations, this is the central hub of the system. It not only serves information, but also decides on the appropriate content based on the consumer's usage context. It features a number of services, which are responsible for the particular content and activities within the consumer's browser. There are normal services found on most E-commerce sites such as the shopping cart. The additional services are what distinguish this system and provide the functionality discussed in the vision section. The Web server resides on top of a relational database which contains content data, application control data, and item data. The web server can either pull or have data pushed to it from the back end inventory control system. Coupling with such a back end system may be accomplished using any of a variety of techniques such as those provided by a connection layer such as the Trilogy SAP connector.

Content Management Service

This service is aware of the consumer's physical location and is responsible for controlling content and functionality available based on that location. For example, a person browsing the site at an in-store kiosk would not be able to browse the whole web directly, and would see content and functionality relevant to that particular store. The user's session state information stores this location as it is fundamental to several of the services. Based on previous interaction that a consumer has had at a particular location, additional levels of personalization would be possible. For instance a customer might be able to view his purchase history.

Map Service

An underlying mapping service functionality facilitates the business model described herein. A two or three dimensional map of the store, which can be zoomed and otherwise interacted with, can be displayed in response to location queries, or used as a gateway for location queries directly. The basis of the map, the layout of physical entities within the store such as racks, walkways, displays etc are laid out in a bitmap of one or more layers. This is constructed using a maintenance tool, which links the drawing to a three-dimensional coordinate space. This basic map can be implemented in Java or any other technology for displaying graphical data within a client web browser. The map is tied to physical inventory data from the Web Server's database. The inventory items carry additional properties, which give an item's stock location in the same three-dimensional coordinates as the basic map. Given an item's SKU data, the map service displays the location of the item within the store. This map service can also be used by store personnel to find the proper location when stocking the shelves. Given the item's SKU the lookup for physical location is a simple SQL query to the database. Once the data is retrieved, it is related to the base map and the location is displayed at the smallest zoom level. Zooming in will give a better view down to a shelf or rack view, which can display the item's location exactly. Because the maintenance overhead of this information could be high, especially with moved or misplaced items, the customer as well as store personnel is able to enter feedback on the actual location of the item. Of course, this would require store personnel confirmation to prevent malicious damage.

Locator Service

In some realizations, this service actually combines multiple functions. The first is to find an item when the consumer knows what he wants and can describe it, but doesn't know the name for the item. In this part of the service, keywords and phrases are entered into the database for items using the maintenance tool. The keywords and phrases might describe the physical composition of the article, what it does, or how it does it. In some realizations, the technology is similar to that employed by existing web search engines. In others, a method is provided for easy search queries and easy maintenance in a way designed specifically for the retail of items. Instead of searching the web or site, the query is issued directly against those fields in the database maintained specifically for that purpose. The tool is also able to capture the queries that customers enter, and link them directly to the items when successfully located, providing a richer basis for future customers. It is possible to refine the scope of a query by linking items to relevant categories specific to the particular retail business, for example "Plumbing and toilets". In this example if the consumer were looking for a replacement flapper valve it would be categorized in this way, and search keywords or phrases might include the following "rubber", "flapper", "controls flushing", "goes up and down when you push the handle", "fix leaking toilet".

Once the item to be located has been successfully identified, the next part of the service is to locate the item for the customer. This part of the service is aware of the physical location of the consumer. If the consumer were browsing from a remote location, the service would attempt to locate the item in the store of choice, the nearest store or the on-line business. The preference of where to look is controlled by the consumer and could optionally be tied to a personalization profile for that user. If the consumer were already in a store then the location would primarily be directed at that store.

Failure to locate the item in store would pass over to a search at other stores or on line, by passing through the inter store connector service. Part of the service is responsible for serving the same query results to other stores that might be looking for the item. Once the consumer has decided upon a source location for the item, the service talks directly to the map service to give a precise location within the store.

Inter Store Connector Service

This service is responsible for managing a complex topology of stores and business and channeling or marshalling requests to the appropriate stores or warehouse. For example a location request might be passed on in order of closest geographical location. Each store or warehouse has information in the database that is relevant, such as address, zip code, geographical coordinates, hours of business etc. For example it may or may not make sense to channel a request to a store that was currently closed. This could be extended to include other businesses in a partnership Store Feedback Service This provides multiple functions.
1. Provide normal customer satisfaction feedback to the store.
2. Provide a way for customers to participate in site maintenance.
3. Provide alarms for intervention by store personnel.
4. Provide a direct service request to store personnel.

This service is based on user ID and user type. For example, when a user of the map service decides to enter feedback on a misplaced item, store personnel have to review the request and approve it. An alarm could be sent to the store personnel and they could decide to move the item to its correct location or to simply update the data records. If a customer at a kiosk wants direct help from a store assistant, and none was readily available, pressing a button would send a request for assistance at that location. The consumer would optionally be asked to provide detail of the type of assistance required.

Virtual Store Service

This service is not to provide on-line shopping, but to provide a way to navigate the bricks and mortar store in the same way you can browse an on-line store. It features content about the departments and services as well as links to the map. The information presented by this service is closely linked to the map by regions. Each region not only has coordinate properties but also custom content which can be managed independently by each department.

Delivery and Pickup Services

These services are about how the consumer takes possession of the items being purchased. This spans the gap completely between on-line and traditional shopping. There are now three ways for a customer at a bricks and mortar store to take ownership of a purchased item. Aside from the normal way of visiting the store and walking around to collect the items, the customer can have the products ordered remotely be available for either pickup or delivery. Similarly the delivery service can be used by a customer already in the store to have large items delivered as normal. These services are closely tied to the pricing engine to dynamically apply the rules for additional cost for these premium services. Such rules as "The customer spends more than one thousand dollars then delivery is free" are easily entered and applied.

While the invention has been described with reference to various embodiments, it will be understood that these embodiments are illustrative and that the scope of the invention is not limited to them. Many variations, modifications, additions, and improvements are possible. Plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Structures and functionality presented as discrete components in the exemplary configurations may be implemented as a combined structure or component. These and other variations, modifications, additions, and improvements may fall within the scope of the invention as defined in the claims that follow.

What is claimed is:

1. A method of integrating electronic commerce and physical store front retailer selling channels, the method comprising:
    providing at least a first consumer with in-store access from locations internal the physical store front retailer to inventory information particular to the physical store front retailer;
    providing at least a second consumer with web browser access from locations external to the physical store front retailer to an electronic commerce information service; and
    allowing the second consumer user of the electronic commerce information service to order items from the inventory of the physical store front retailer and from inventory of a distribution center cooperative with the physical store front retailer.

2. The method of claim 1,
    wherein the access provided the first consumer is via one of a shopper-accessible kiosk and a mobile phone of the first consumer, wherein the kiosk or mobile phone is, at the time of the provided access, co-located with the physical store front retailer and communicatively coupled with an inventory control information service for the physical store front retailer.

3. The method of claim 1, further comprising:
    employing a physical location identification service accessible via either or both of the in-store access and the electronic commerce information service, the physical location identification service coupled to the inventory control information service to identify a particular item from current stock and to identify therefor a physical location within the physical store front retailer.

4. The method of claim 1, further comprising:
    allowing the first consumer user to order items from the inventory of the physical store front retailer and from inventory of a distribution center cooperative with the physical store front retailer.

5. The method of claim 1,
    wherein the provided access to inventory information is via an inventory control information service that mediates access to inventory state that spans the physical store front retailer and at least a second physical store front retailer.

6. The method of claim 1,
    wherein the inventory information particular to the store front retailer includes one or more of stock status, pricing, and catalog information.

7. The method of claim 1, wherein the locations external to the physical store front retailer include one or more of:
    the user's home;
    the user's Office; and
    a location accessible via the Internet.

* * * * *